US008160764B2

(12) United States Patent
Choi et al.

(10) Patent No.: US 8,160,764 B2
(45) Date of Patent: Apr. 17, 2012

(54) METHOD FOR PROVIDING VEHICLE ACCIDENT INFORMATION AND APPARATUS THEREFOR

(75) Inventors: Hae ock Choi, Daejeon (KR); Hyun-Kyun Choi, Daejeon (KR); Hyun-Seo Oh, Daejeon (KR); Wan Sik Choi, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 960 days.

(21) Appl. No.: 12/125,992

(22) Filed: May 23, 2008

(65) Prior Publication Data

US 2009/0105902 A1 Apr. 23, 2009

(30) Foreign Application Priority Data

Oct. 22, 2007 (KR) ........................ 10-2007-0106066

(51) Int. Cl.
*G01C 22/00* (2006.01)

(52) U.S. Cl. ................. 701/24; 701/25; 701/35; 701/36

(58) Field of Classification Search .................... 701/35, 701/24, 25, 36
See application file for complete search history.

(56) References Cited

U.S. PATENT DOCUMENTS

| | | | | |
|---|---|---|---|---|
| 6,707,391 | B1 * | 3/2004 | Monroe | 340/901 |
| 6,894,606 | B2 | 5/2005 | Forbes et al. | |
| 6,912,452 | B2 * | 6/2005 | Sakamoto et al. | 701/1 |
| 7,474,946 | B2 * | 1/2009 | Kamiya | 701/33 |
| 2009/0015684 | A1 | 1/2009 | Ooga et al. | |

FOREIGN PATENT DOCUMENTS

| | | | |
|---|---|---|---|
| JP | 2004-017901 | A | 1/2004 |
| JP | 2004-0139204 | A | 5/2004 |
| JP | 2004-291761 | A | 10/2004 |
| JP | 2007047860 | | 2/2007 |
| KR | 1020020068186 | | 8/2002 |
| KR | 1020060053662 | | 5/2006 |
| KR | 1020070041279 | | 4/2007 |
| KR | 1020070066662 | | 6/2007 |
| WO | 2007080921 | A1 | 7/2007 |

OTHER PUBLICATIONS

KIPO Office Action received Nov. 28, 2008 for the instant application's foreign priority application (Korean Patent Application No. 10-2007-0106066).

* cited by examiner

*Primary Examiner* — Toan To
(74) *Attorney, Agent, or Firm* — Kile Park Goekjian Reed & McManus PLLC

(57) ABSTRACT

An apparatus for providing vehicle accident information periodically collects vehicle travel information, and stores vehicle travel information that is collected during an accident of a vehicle, in a vehicle black box. The apparatus for providing vehicle accident information collects information about other vehicles through communication with the other vehicles during the accident of the vehicle, and stores the collected information in the vehicle black box. Since the information about the other vehicles is collected through communication with the other vehicles as described above, it is possible to provide more accurate and efficient information required for dealing with the accident. In addition, vehicle accident information, which includes time when an accident occurs, location where an accident occurs, and the type of accident, is transmitted to a related agency such as a police station and a traffic center, so that it is possible to quickly deal with the accident.

6 Claims, 3 Drawing Sheets

METHOD FOR PROVIDING VEHICLE ACCIDENT INFORMATION AND APPARATUS THEREFOR

CROSS-REFERENCE TO RELATED APPLICATION

This application claims priority to and the benefit of Korean Patent Application No. 10-2007-0106066 filed in the Korean Intellectual Property Office on Oct. 22, 2007, the entire contents of which are incorporated herein by reference.

BACKGROUND OF THE INVENTION (a) Field of the Invention

The present invention relates to a method for providing vehicle accident information and an apparatus therefor.

The present invention is supported by the IT R&D program of MIC/IITA [2007-F-039-01, Vehicle Multi-hop Communication Technology Development].

(b) Description of the Related Art

As the number of vehicles has increased and vehicles have been used as a more essential element of living, the danger of vehicle accidents has increased. Accordingly, vehicle technologies in the related art attach importance to the performance improvement of a vehicle as means of transportation, but technologies regarding vehicle accidents and vehicle safety services related to life have become important in recent years.

In general, the following method has been proposed as a technology related to a vehicle accident. In the method, vehicle travel information obtained from sensors mounted on main parts of a vehicle, or images obtained from cameras mounted on the vehicle during an accident are stored in a vehicle black box, and the accident is reconstructed using the stored images or travel information. Alternatively, a technology for transmitting accident occurrence information through satellite communication during an accident has been proposed.

However, according to technologies related to vehicle accidents that have been proposed in recent years, additional equipment such as sensors or cameras are mounted on a vehicle and information input from the additional equipment should be processed in the vehicle. For this reason, it is not possible to quickly deal with an accident. Further, there is a problem in that the cause of a vehicle accident is not necessarily accurately established from this information.

SUMMARY OF THE INVENTION

The present invention has been made in an effort to provide a method and apparatus for providing vehicle accident information having advantages of quickly dealing with an accident during a vehicle accident and accurately establishing the cause of the vehicle accident.

An exemplary embodiment of the present invention provides an apparatus for providing vehicle accident information. The apparatus includes a storage device, a travel information collecting device, and a vehicle information collecting device. Information required to analyze an accident is stored in the storage device. The travel information collecting device collects vehicle travel information of the vehicle and stores the vehicle travel information in the storage device during the accident of the vehicle. The vehicle information collecting device collects information about other vehicles through communication with other vehicles during the accident of the vehicle, and stores the collected information about the other vehicles in the storage device.

Another exemplary embodiment of the present invention provides a method of providing vehicle accident information. The method includes collecting vehicle travel information of a vehicle and collecting information about other vehicles through communication with the other vehicles during an accident of the vehicle. In this case, accident information is analyzed from the collected vehicle travel information of the vehicle and the collected information about other vehicles.

According to an exemplary embodiment of the present invention, since travel information of an accident vehicle and information about other vehicles are provided during a vehicle accident, information related to the vehicle accident and a witness is ensured. Therefore, it is possible to accurately establish the cause of the accident and to determine the presence of negligence. Further, it is possible to immediately transmit accident occurrence information to a related agency during a vehicle accident. Therefore, it is possible to quickly deal with the accident.

DETAILED DESCRIPTION OF THE EMBODIMENTS

Figure 1:
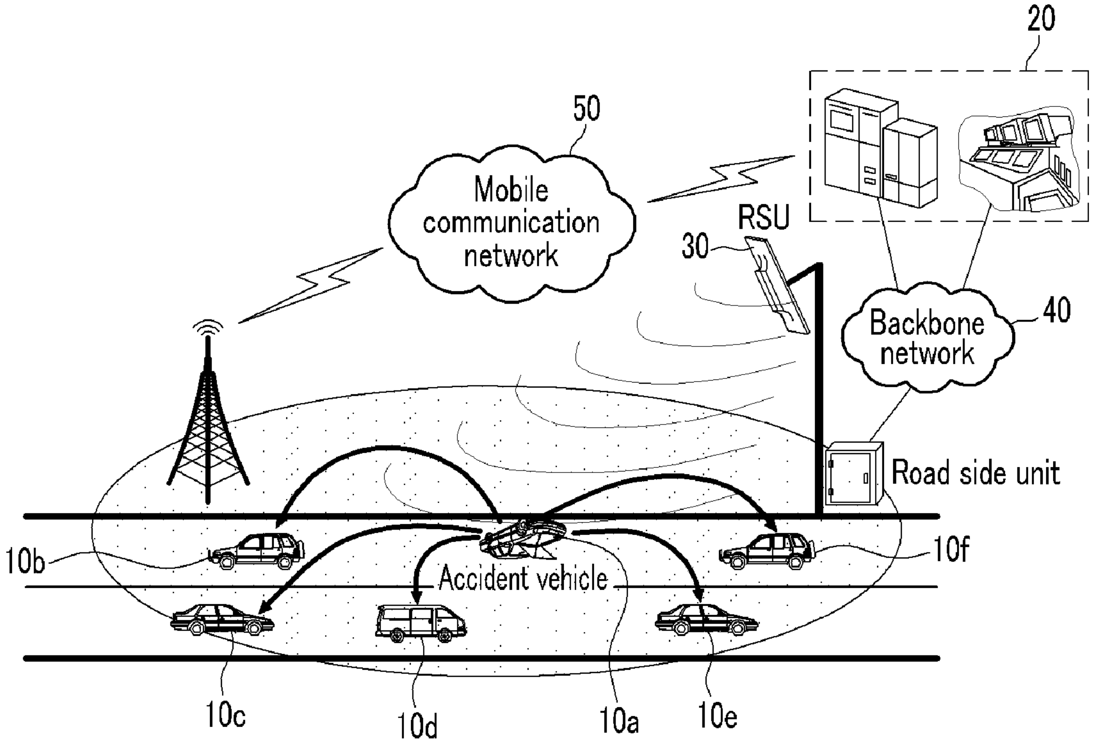
FIG. 1 is a schematic view of an apparatus for providing vehicle accident information according to an exemplary embodiment of the present invention.

In the following detailed description, only certain exemplary embodiments of the present invention have been shown and described, simply by way of illustration. As those skilled in the art would realize, the described embodiments may be modified in various different ways, all without departing from the spirit or scope of the present invention. Accordingly, the drawings and description are to be regarded as illustrative in nature and not restrictive. Like reference numerals designate like elements throughout the specification.

It will be further understood that the terms "comprises" and/or "comprising," when used in this specification and claims, specify the presence of stated features, integers, steps, operations, elements, and/or components, but do not preclude the presence or addition of one or more other features, integers, steps, operations, elements, components, and/or groups thereof. In addition, the terms "-er", "-or", "module", and "block" described in the specification mean units for processing at least one function and operation, and can be implemented by hardware components or software components, and combinations thereof.

A method and apparatus for providing vehicle accident information according to an exemplary embodiment of the present invention will be described in detail below with reference to drawings.

Figure 2:
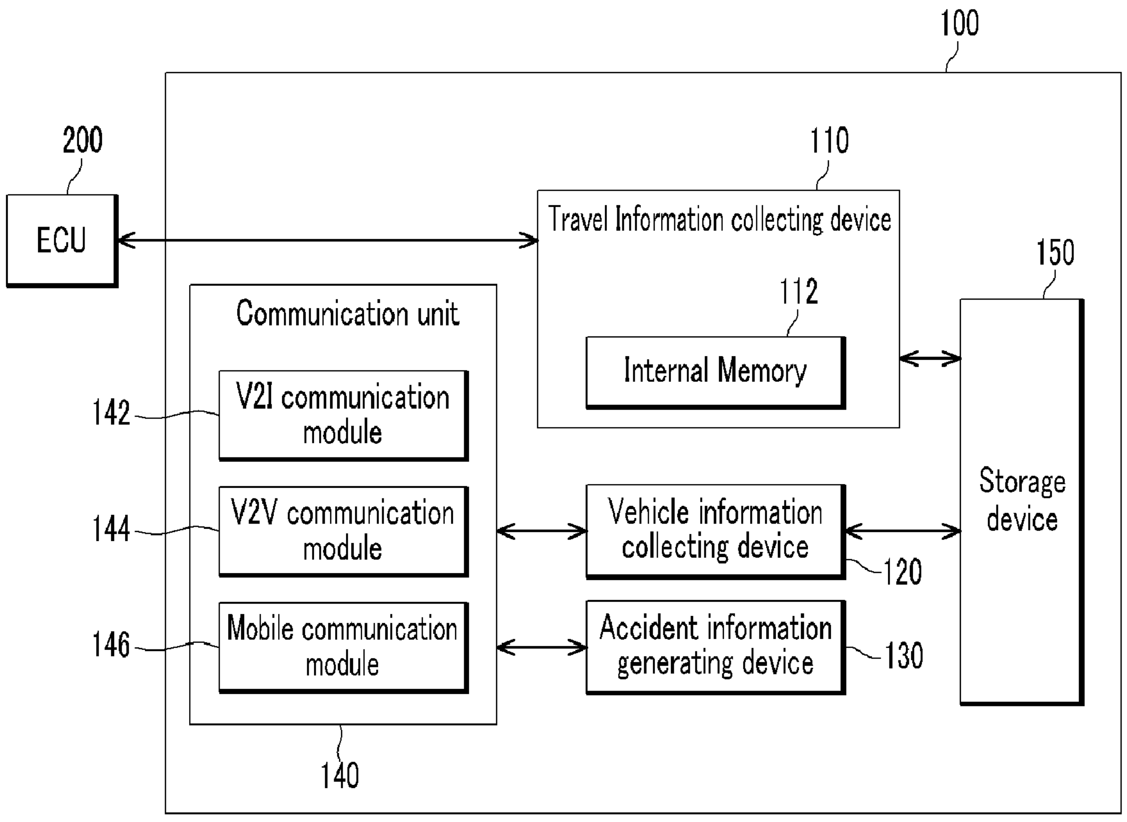
FIG. 2 is a block diagram showing the configuration of the apparatus for providing vehicle accident information according to the exemplary embodiment of the present invention.

FIG. 1 is a schematic view of an apparatus for providing vehicle accident information according to an exemplary embodiment of the present invention, and FIG. 2 is a block diagram showing the configuration of the apparatus for providing vehicle accident information according to the exemplary embodiment of the present invention.

First, as shown in FIG. 1, the apparatus for providing vehicle accident information according to the exemplary embodiment of the present invention is mounted on each of vehicles 10*a*, 10*b*, 10*c*, 10*d*, 10*e*, and 10*f*. In this case, the apparatus for providing vehicle accident information of an accident vehicle 10*a*, which is subject to an accident, stores vehicle travel information and information about other vehicles, which is collected through the communication with other vehicles 10*b*, 10*c*, 10*d*, 10*e*, and 10*f*, in a storage device. The information stored as described above is used as data to establish the cause of the accident and to determine the presence of negligence. Further, the apparatus for providing vehicle accident information of the accident vehicle 10*a* generates accident occurrence information during the accident, and immediately transmits the accident occurrence information to a related agency 20 such as a traffic information center or a police station so that the accident can be quickly dealt with. In this case, if communication infrastructure (RSU, road side unit) 30 is provided on a road, the accident occurrence information is transmitted to the related agency through a backbone network 40. If not, the accident occurrence information is transmitted to the related agency through a mobile communication network 50.

Referring to FIG. 2, an apparatus 100 for providing vehicle accident information according to the exemplary embodiment of the present invention includes a travel information collecting device 110, a vehicle information collecting device 120, an accident information generating device 130, a communication device 140, and a storage device 150.

The travel information collecting device 110 includes an internal memory 112. The travel information collecting device 110 is periodically or a periodically connected to an electronic control unit (hereinafter referred to as an "ECU") 200 that controls parts having charge of the travel of a vehicle, collects vehicle travel information, and stores the collected vehicle travel information in the internal memory 112. In this case, the travel information collecting device 110 is connected to the ECU 200 on the basis of network (MOST, CAN, LIN) communication standards for a vehicle. Further, the travel information collecting device 110 stores the vehicle travel information, which is stored in the internal memory 112, in the storage device 150 during a vehicle accident. The vehicle travel information may include information about speed, acceleration/deceleration, and position, as well as the operation of an ABS (anti-lock braking system), a steering wheel, and a brake.

The vehicle information collecting device 120 communicates with other vehicles through the communication device 140 during a vehicle accident in order to collect information about other vehicles, and stores the collected information about other vehicles in the storage device 150. The information about other vehicles may include vehicle ID (identification) information and vehicle numbers that are used to identify other vehicles.

The accident information generating device 130 generates accident occurrence information during a vehicle accident, and transmits the accident occurrence information to a related agency through the communication device 140. The accident occurrence information may include time when an accident occurs, location where an accident occurs, and the type of accident.

The communication device 140 includes a vehicle-to-infrastructure (V2I) communication module 142, a vehicle-to-vehicle (V2V) communication module 144, and a mobile communication module 146. If communication infrastructure (RSU, road side unit) is provided on a road, accident occurrence information is transmitted through the vehicle-to-infrastructure communication module 142. If the communication infrastructure is not provided on the road, accident occurrence information is transmitted through the mobile communication module 146. Further, information about other vehicles is collected by the vehicle-to-vehicle communication module 144.

Vehicle travel information and information about other vehicles during an accident are stored in the storage device 150. A vehicle black box may be used as the storage device 150. That is, in the case of a vehicle including a vehicle black box, the vehicle black box may be used as the storage device 150. If a vehicle black box is used as the storage device 150 as described above, additional devices do not need to be provided as the storage device 150.

A method of providing vehicle accident information of the apparatus for providing vehicle accident information according to an exemplary embodiment of the present invention will be described below with reference to FIG. 3.

Figure 3:
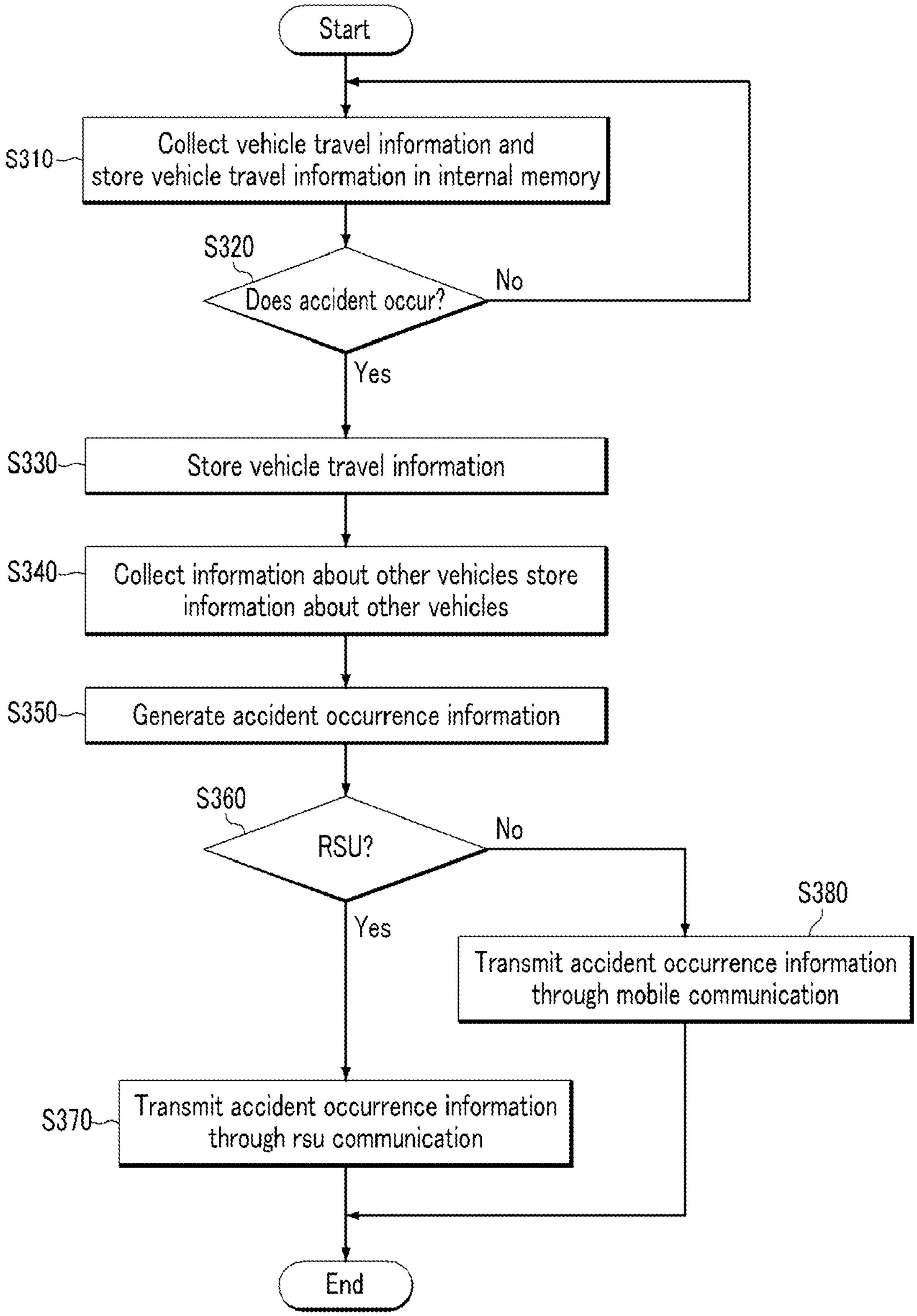
FIG. 3 is a flowchart illustrating the operation of the apparatus for providing vehicle accident information according to the exemplary embodiment of the present invention.

FIG. 3 is a flowchart illustrating the operation of the apparatus for providing vehicle accident information according to the exemplary embodiment of the present invention.

As shown in FIG. 3, the travel information collecting device 110 is periodically connected to the ECU 200 during the travel of a vehicle, collects vehicle travel information, and stores the collected vehicle travel information in the internal memory 112 (S310).

Meanwhile, when an accident occurs on a vehicle (S320), the travel information collecting device 110 of the accident vehicle stores vehicle travel information, which is stored in the internal memory 112, in the storage device 150 (S330). Then, the vehicle information collecting device 120 of the accident vehicle collects information about other vehicles through communication between vehicles, and stores the information about other vehicles in the storage device 150 (S340). The information, which is stored in the storage device 150 as described above, is used as important data to establish the cause of the accident and to determine the presence of negligence.

Further, the accident information generating device 130 of the accident vehicle generates accident occurrence information during an accident, and transmits the accident occurrence information to a related agency (S350-S380). In this case, if a communication infrastructure (RSU, road side unit) is provided on a road (S360), the accident information generating device 130 drives the vehicle-to-infrastructure communication module 142 to transmit the accident occurrence information to the related agency through the vehicle-to-infrastructure communication module (S370). If the communication infrastructure (RSU, road side unit) is not provided on the road, the accident information generating device 130 drives the mobile communication module 146 to transmit the accident occurrence information to the related agency through the mobile communication module (S380).

The exemplary embodiment of the present invention is not only embodied by the above-mentioned apparatus and/or method, and may be embodied by a program implementing functions corresponding to the configuration of the exemplary embodiment of the present invention or a recording medium on which the program is recorded. This embodiment can be easily made from the description of the above-mentioned exemplary embodiment by those skilled in the art to which the present invention pertains.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. An apparatus for providing vehicle accident information, the apparatus comprising:

a storage device in which information required to analyze an accident is stored;

a travel information collecting device that collects vehicle travel information of a vehicle and stores the vehicle travel information in the storage device during an accident of the vehicle;

a vehicle information collecting device that collects information about other vehicles through communication with the other vehicles during the accident of the vehicle, and stores the collected information about the other vehicles in the storage device; and an accident information generating device that generates accident occurrence information during the accident of the vehicle, and transmits the accident occurrence information to a related agency, wherein the accident occurrence information is transmitted through communication between the vehicle and road infrastructure or mobile communication.

2. The apparatus of claim 1, wherein the travel information collecting device collects the vehicle travel information from an electronic control unit (ECU) that controls parts having charge of the travel of the vehicle.

3. The apparatus of claim 1, wherein the storage device is a vehicle black box.

4. A method of providing vehicle accident information, the method comprising:

collecting vehicle travel information of a vehicle; and collecting information about other vehicles through communication with the other vehicles during an accident of the vehicle, wherein accident information is analyzed from the collected vehicle travel information of the vehicle and the collected information about other vehicles; and generating accident occurrence information during the accident of the vehicle and transmitting the accident occurrence information to a related agency.

5. The method of claim 4, wherein the collecting of the vehicle travel information comprises being connected-to an electronic control unit (ECU) that controls parts having charge of the travel of the vehicle, and collecting vehicle travel information from the connected electronic control unit.

6. The method of claim 4, wherein the accident occurrence information is transmitted through communication between a vehicle and road infrastructure or mobile communication.

* * * * *